United States Patent [19]
Cole

[11] 4,195,385
[45] Apr. 1, 1980

[54] ROTATING SECURITY HINGE

[76] Inventor: George A. Cole, 4529 Royal Oak Dr. S.W., Roanoke, Va. 24015

[21] Appl. No.: 905,289

[22] Filed: May 11, 1978

[51] Int. Cl.² ............................ E05D 1/06; E05D 7/10
[52] U.S. Cl. ........................................ 16/171; 256/65; 403/7; 403/192
[58] Field of Search .................. 16/128 R, 171, 179, 16/174, 175, 177, 143, 144, 146, 136; 403/7, 192, 231, 297; 256/65, 69, 73

[56] References Cited

U.S. PATENT DOCUMENTS

| | | | |
|---|---|---|---|
| 2,307,753 | 1/1943 | Anderson | 16/179 |
| 3,734,076 | 5/1973 | Kiziol | 16/171 X |

FOREIGN PATENT DOCUMENTS

| | | | |
|---|---|---|---|
| 511370 | 5/1952 | Belgium | 16/179 |
| 287390 | 2/1965 | Netherlands | 16/171 |
| 317643 | 8/1929 | United Kingdom | 16/171 |

*Primary Examiner*—C. J. Husar
*Assistant Examiner*—Moshe I. Cohen
*Attorney, Agent, or Firm*—John B. Sponsler

[57] ABSTRACT

A double quill-like, security mechanism having a pair of concentric, hollow cylinders, one positioned to rotate wholly within the other and restricted against axial displacement thereby to provide means for supporting a rotatable gate structure carried by the outer cylinder against removal therefrom except at a predetermined angular relationship of rotation between the two cylinders.

1 Claim, 2 Drawing Figures

ROTATING SECURITY HINGE

BACKGROUND OF THE INVENTION

The need for privacy in the areas of home, business, hunting camp, farm, or ranch frequently requires closing off a private road to unauthorized use thereby giving rise to a demand for a simple easily erected barrier gate of rugged strength and easy operation. The present invention provides a means of constructing such a gate, using readily available materials such as steel pipes not only for the gate per se, but also for supporting the gate in a swingable fashion without sacrificing security, particularly when used in conjunction with a security gate post capable of being locked in accordance with the invention disclosed in copending application Ser. No. 905,288 filed May 11, 1978.

SUMMARY OF THE INVENTION

This invention, therefore, is directed to a rotating security hinge used in the construction of a swinging security gate consisting substantially of a steel pivot post and a gate structure joined thereto via the aforesaid hinge in such a manner that only in a predetermined position of rotation of the swinging gate can dis-assembly of the gate structure be made.

IN THE DRAWINGS

DETAILED DESCRIPTION OF THE INVENTION

Figure 1:
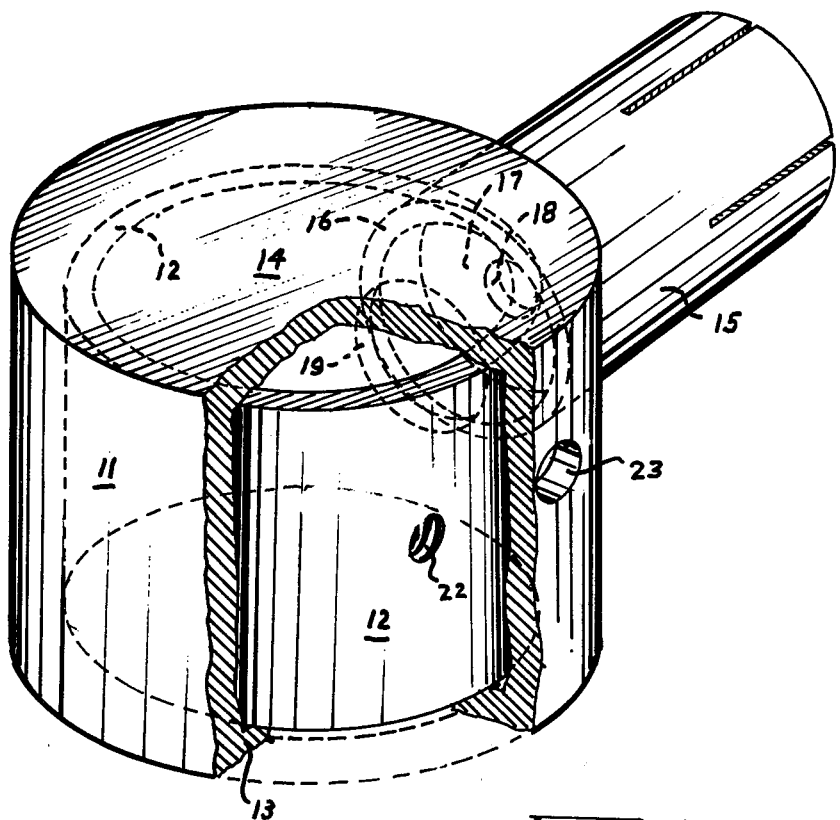
FIG. 1 is a perspective/sectional view of the invention showing the internal arrangement of the parts of the security hinge.
Figure 2:
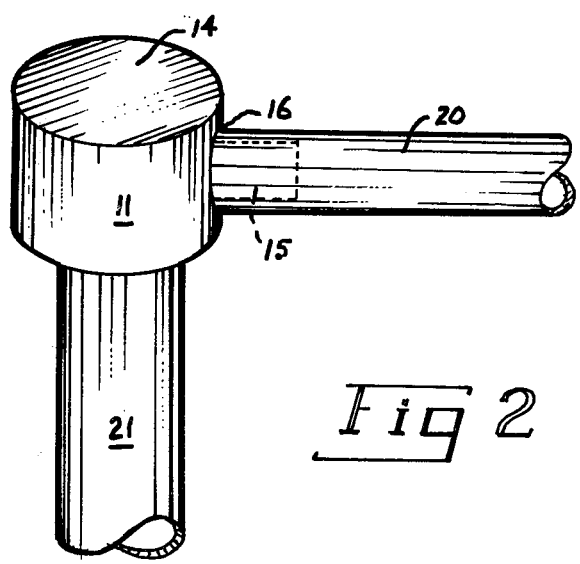
FIG. 2 is a perspective view of the application of the invention to provide a swinging gate structure supported upon a post in a manner previously described making use of steel pipes to provide the entire gate structure.

Referring specifically to FIG. 1 a quill-like arrangement of an outer hollow cylinder 11 and an inner cylinder 12 is shown with the latter being positioned to rotate freely within the former. The outer cylinder 11 is closed at its top end by a disc 14 and the other end of the outer cylinder 11 is provided with a flange 13, thereby effectively enclosing the inner cylinder 12. A split tube 15 is attached to the periphery of the outer cylinder 11 at an opening 16 therein by welding or similar means, and a disc 17 having a hole 18 is similarly fastened inside the tube 15 thereby providing a seat for an expanding inner plug (not shown). The inner cylinder 12 is also provided with an opening 19 through which a tool may be inserted to operate the aforesaid expanding plug via opening 16 and hole 18 whereby a steel pipe 20, or the like, can be fitted over and securely fastened to the tube 15 thereby forming a swinging gate member in respect to the inner cylinder 12. (See also FIG. 2).

The structure above described can thereafter be mounted upon a steel post 21, such as a section of steel pipe erected vertically alongside an area road to be closed off, by fitting the inner cylinder 12 over the post 21 and fastening these two members by a set screw (not shown) coacting with a threaded opening 22 in the cylinder 12. Access to the opening 22, however, can be made only when a corresponding opening 23 in the outer cylinder 11 is rotated into the proper angular position; consequently, by locking the free end of the swinging gate member (e.g., pipe 20) so that the proper angular position is not reached and the opening 22 not exposed, the entire mechanism is securely protected from intrusion.

What is claimed is:

1. A rotating hinge mechanism comprising a pair of hollow cylinders arranged to rotate within one another and restricted in axial movement thereby, means for attaching an external spoke-like member to the periphery of the outer cylinder, an outer member extending over said spoke-like member, said outer member being attached by means accessible only through openings in both said cylinders, and means for attaching another outer member into the inner cylinders, said other member extending axially therefrom, the latter said attaching means being accessible only through an opening in the periphery of the outer cylinder at a predetermined rotational relationship between said cylinders.

* * * * *